June 23, 1936.  T. W. MILLER  2,044,912
FOUNTAIN SYRINGE
Filed Feb. 8, 1933
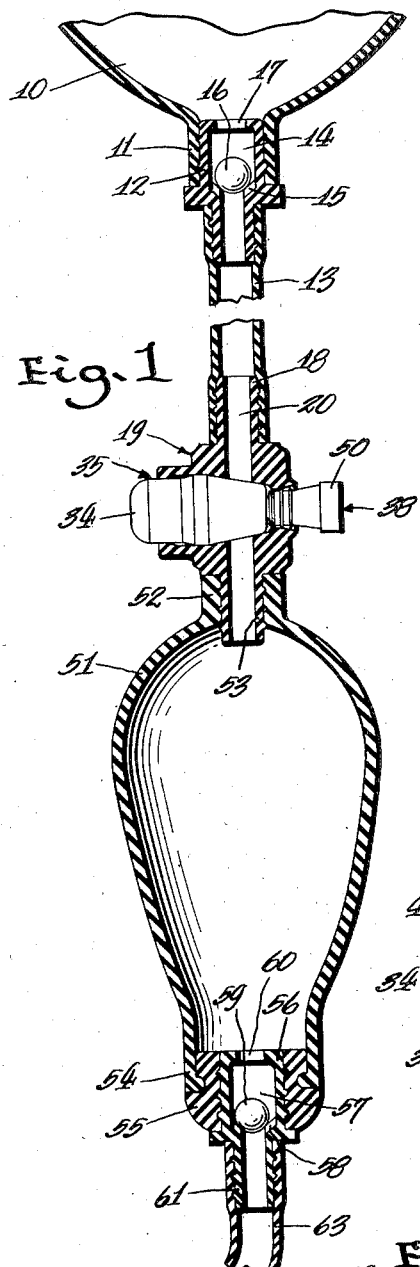
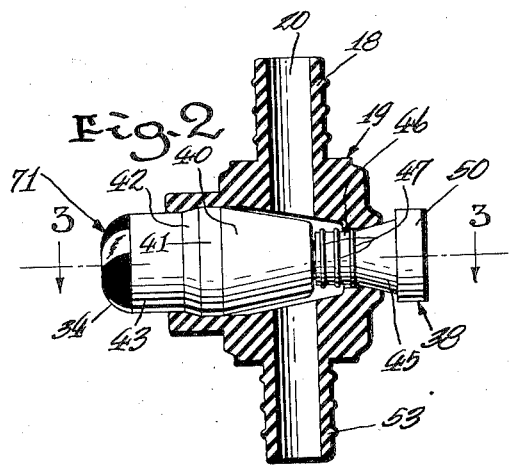
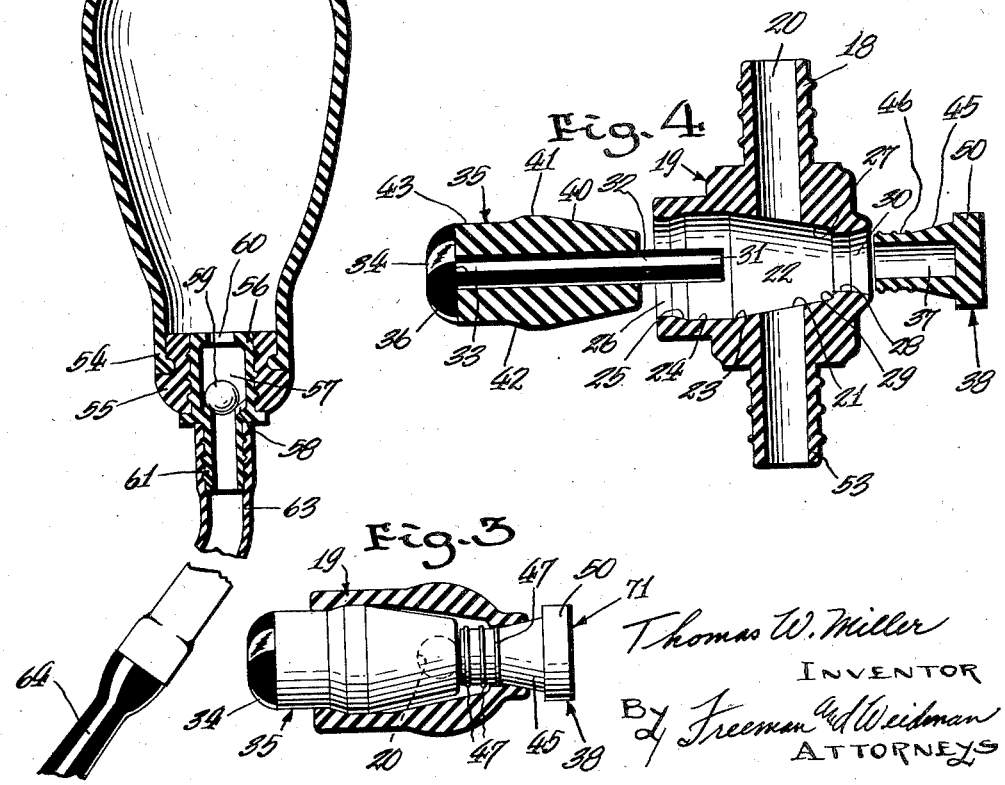
Thomas W. Miller
INVENTOR
By Freeman and Weidman
ATTORNEYS Patented June 23, 1936

2,044,912

UNITED STATES PATENT OFFICE 2,044,912

FOUNTAIN SYRINGE

Thomas W. Miller, Ashland, Ohio, assignor to The Faultless Rubber Company, Ashland, Ohio, a corporation of Ohio Application February 8, 1933, Serial No. 655,690

7 Claims. (Cl. 128—227)

This invention relates to fountain syringes, and has for an object the provision of a new and improved article of this character.

In the drawing accompanying this specification and forming a part of this application, I have shown, for purposes of illustration, one embodiment which my invention may assume, and in the drawing:

Figure 1 is a broken sectional view, partly in elevation, of the embodiment herein disclosed, showing the valve in closed position, Figure 2 is an enlarged vertical sectional view, partly in elevation, showing the valve in open position, Figure 3 is a horizontal sectional view, corresponding substantially to the line 3—3 of Figure 2, while Figure 4 is an enlarged vertical sectional view, showing the associated valve parts separate, prior to their assembly.

The embodiment herein disclosed comprises a flexible rubber bag 10 (not completely shown) having adjacent its lower end a restricted portion 11 embracing, and cemented to, one end of a sleeve 12 of relatively stiff rubber, the lower reduced end of which projects into the upper end of a flexible rubber tube 13.

The sleeve 12 contains an enlarged valve chamber 14 having at its lower end a radially corrugated surface 15 upon which a ball valve 16 is adapted to rest, but which permits fluid to pass thereby from the receptacle 10 to the tube 13. At the upper end of the chamber 14 is a valve seat 17 upon which the ball valve 16 is adapted to seat, to prevent back-flow of fluid from the tube 13 into the receptacle 10. The lower end of the tube 13 frictionally embraces the tubular end 18 of a valve body 19 and communicates with one end of a bore 20 extending longitudinally through the valve body 19.

The valve body 19 is of relatively hard material, such as hard rubber or the like, to prevent undue deformation under pressure and be substantially self-supporting. The bore 20 is transversely intersected by a central portion 21 of a bore 22 extending through the body 19, and the central portion 21 is of conical configuration, the larger end 23 thereof merging into one end of a cylindrical chamber 24 of substantially the same cross-section as the large end 23, the other end of the chamber 24 being tapered inwardly, of conical configuration, as indicated at 25, and terminating in a cylindrical aperture 26 disposed axially with respect to the bore 22. The reduced end 27 of the conical portion 21 communicates with one end of an axially disposed cylindrical bore 28 of slightly less diameter, forming an annular shoulder 29 therebetween, and the other end of the bore 28 terminates in an annular outwardly tapered opening, of conical configuration, as indicated at 30.

Reciprocally mounted in the bore 22 is a valve structure, indicated as an entirety at 71, of non-corrosive material, and comprises a stem 32 of hard or semi-hard material, as rubber, or the like, to prevent undue deformation under pressure, and the stem 32 is provided at one end 33 with an enlarged knob 34. Cemented to the stem 32 is a valve 35 of relatively soft rubber, or the like, one end of the valve 35 abutting against the shoulder 36 formed by the knob 34 and the reduced stem 32, the other end of the valve 35 terminating short of the opposite end 31 of the stem 32, and the end portion 31 is adapted to be frictionally embraced in the axially disposed recess 37 of a valve closure 38 provided with a knob 50. The valve 35 is provided with a conical portion 40, a cylindrical section 41, a conical portion 42, and a cylindrical section 43, each of which is respectively adapted to seat in the corresponding parts 21, 24, 25, and 26 of the bore 22 extending through the valve body 19; and the closure 38 is provided with a conical portion 45, and a cylindrical section 46, adapted respectively to seat in the corresponding parts 30 and 28 of the bore 22. The cylindrical section 46 of the closure 38 is provided with spaced annular ribs 47 adapted to continuously and intimately engage the cylindrical bore 28 when the valve 35 is entirely open, partially open, or completely closed, thereby preventing leakage of fluid through the bore 28 when the valve 35 is disposed in any position; and the conical portion 45 engages the conical seat 30 when the valve 35 is in open or partially opened position, so as to seal the small end of the bore 22. The conical portion 42 engages the corresponding surface 25 when the valve 35 is in open position, and the conical portion 40 engages the corresponding surface 21 when the valve 35 is partially open or completely closed, to thus close the large end of the bore 22 regardless of the position of the valve 35.

The valve structure 35 is easily assembled in the valve body 19, as is best shown in Figure 4, wherein the conical portion 40 is sprung through the aperture 26 into the bore 22, the end 31 of the stem 32 projecting through the opening 30 for frictional detachable insertion in the recess 37 of the closure 38.

Pressure on the knob 50 moves the valve 35 in the bore 22 to unseat the conical portion 40 of the valve 35 from the central portion 21 of the bore 22, opening the passage 20, establishing communication with the receptacle 10, some of the annular ribs 47 engaging the cylindrical bore 28 in fluid sealing relation, and pressure on the opposite knob 34 reverses the original movement of the valve 35 and closes the passage 20 to cut off communication with the receptacle 10, the conical portion 40 of the valve 35 engaging the conical central portion 21 of the bore 22 in fluid sealing relation. The opening movement of the valve 35 is limited by engagement of the tapered surfaces 25 and 42, while the closing movement of the valve 35 is limited by the seating of the conical portion 40 in the conical central portion 21 of the bore 22.

The passage 20 communicates at its other end with the upper end of a collapsible rubber bulb 51 having a restricted portion 52 which frictionally embraces the tubular end 53 of the valve body 19, and having at its other end a neck portion 54 which frictionally embraces a relatively soft rubber sleeve 55 frictionally embracing a relatively hard rubber sleeve 56.

The hard rubber sleeve 56 contains an enlarged valve chamber 57 having at its lower end a radial corrugated surface 58 upon which a ball valve 59 is adapted to rest, but which permits fluid to pass from the receptacle 10 and the bulb 51, and at the upper end, the chamber 57 carries a valve seat 60 upon which the ball valve 59 is adapted to seat, to prevent back-flow of fluid into the bulb 51. The lower end 61 of the sleeve 56 is frictionally embraced by the upper end of a flexible rubber tube 63, the lower end of which embraces a suitable discharge nozzle 64, partially shown.

When the valve 35 is opened, communication is established with the receptacle 10, and the fluid will flow from the discharge nozzle 64 in a continuous stream, by gravity, and with a force determined by the hydrostatic head of the fluid, and continuance of flow of fluid is stopped by moving the valve 35 to closed position.

When used in this manner, my invention fulfills all the requirements of a syringe.

However, if it is desired that the fluid during its flow be ejected with greater force, the bulb 51 is compressed, thereby exerting additional pressure on the fluid in the tube 63, below the valve chamber 57, causing the fluid to emerge from the nozzle 64 in the required jet or spray.

As soon as the pressure on the bulb 51 is removed, the fluid from the bag 10 will flow into the bulb 51, to refill the bulb, and the fluid will emerge from the nozzle 64 in a continuous stream, as before, unless and until the bulb 51 is again collapsed, to repeat the force ejection.

When used in this manner, my invention aptly serves as a douche.

The back-flow of fluid through the valve mechanism is prevented by means of the ball valve 59. This valve is normally open, resting on the corrugated surface 58, permitting fluid to pass, but rises to close the passage immediately any fluid begins to back-flow when the bulb 51 is released from collapsed position. Similarly, the back-flow of fluid into the receptacle 10 is prevented by means of the ball valve 16. This valve is normally open, resting on the corrugated surface 15, permitting fluid to pass, but rises to close the passage immediately the bulb 51 is compressed and fluid pressure is applied.

From the foregoing, it will be obvious that my device is applicable for use not only as a syringe, but also as a douche; that the valve 35 is easily operated by the opposed fingers of the one hand of a user alternately applying pressure to the valve 35 in opposite directions transversely with respect to the valve body 19, without deforming the flexible rubber tubing 13 and 63 to interfere with the flow of fluid therethrough; that the valve 35 is easily assembled in the valve body 19; and the annular ribs 47 and conical surfaces effectively seal the bore 22 against leakage regardless of the position of the valve 35.

Under these circumstances it will be apparent to those skilled in the art that the embodiment herein disclosed accomplishes at least the principal object of the invention, but also, that the construction is adaptable to a wide variety of uses, and embodies advantages other than those herein discussed, and also, that the particular embodiment may be variously changed and modified without departing from the spirit or scope of the invention, and accordingly, it will be understood that the above disclosure is illustrative only, and that my invention is not limited thereto.

I claim:

1. In a device of the character described, a valve housing of rigid material having a conduit, and having a bore intersecting said conduit and provided with valve seat means, and valve mechanism disposed in said bore and cooperable with said seat means, shiftable in one direction to open passage through said conduit, and shiftable in an opposite direction to close passage through said conduit, said valve mechanism being of two part construction, said parts being insertable from opposite sides of said bore and telescopically engaged and thus held in assembled relation.

2. In a device of the character described, a valve housing of rigid material having a conduit, and having a bore intersecting said conduit and provided with valve seat means, and valve mechanism disposed in said bore and cooperable with said seat means, shiftable in one direction to open passage through said conduit, and shiftable in an opposite direction to close passage through said conduit, said valve mechanism including a valve member of relatively yieldable material sprung into place in said bore and thus maintained in assembled operative condition.

3. In a device of the character described, valve means having a conduit, and having a bore intersecting said conduit, and valve mechanism disposed in said bore, shiftable in one direction to open passage through said conduit, and shiftable in an opposite direction to close passage through said conduit, said valve mechanism having opposed conical valve means at one side of said bore, and valve means at the other side of said bore, provided with a seat and laterally projecting ribs movable with reference to said seat and constantly in engagement therewith, said valve means being operable to continuously seal the ends of said bore regardless of the position of said valve mechanism.

4. A device of the character described, comprising: a valve body, having a fluid conduit extending therethrough, and having a valve bore intersecting said conduit and traversing said body, said valve bore including a conical valve seat; and a conical longitudinally shiftable valve member, disposed within said bore, and provided adjacent each end of said bore with a conical surface tapering in an opposite direction to that of the taper of said valve member, and engageable with adjacent portions of said bore, said valve member having operative portions extending outwardly from the ends of said bore, on opposite sides of said body, whereby said member may be shifted in one direction by operation on one of said portions to seat said conical valve member on said valve seat and interrupt communication through said fluid conduit, and in the other direction by operation on the other of said portions to remove said valve member from said valve seat to establish communication through said fluid conduit, and simultaneously engage said conical surfaces of said valve member with adjacent portions of said bore to seal the same.

5. A device of the character described, comprising: a valve body, having a fluid conduit extending therethrough, and having a valve bore intersecting said conduit and traversing said body, said valve bore including a valve seat; and longitudinally shiftable valve mechanism disposed in said bore, comprising a substantially rigid member traversing said bore, and a relatively softer member carried thereby, cooperable with said valve seat to control fluid flow through said conduit, said rigid member having operative portions extending outwardly from the ends of said bore, on opposite sides of said body, whereby said valve mechanism may be shifted in one direction by operation on one of said portions, and in another direction by operation on the other of said portions.

6. A device of the character described, comprising: a valve body, having a fluid conduit extending therethrough, and having a valve bore intersecting said conduit and traversing said body, said bore including a conical valve seat adjacent said conduit and conical sealing seat means on opposite sides of said conduit and of an opposite taper than said conical valve seat; and longitudinally shiftable valve mechanism disposed in said bore, comprising a substantially rigid member traversing said bore and a relatively softer member carried thereby, having a conical valve portion cooperable with said valve seat to control fluid flow through said conduit, and also having a conical portion cooperable with one of said sealing seat means, and another relatively softer member also carried by said rigid member and having a conical portion cooperable with the other of said sealing seat means, both of said conical portions being tapered in a direction opposite to that of said valve portion, said rigid member having operative portions extending outwardly from the ends of said bore, on opposite sides of said body, whereby said valve mechanism may be shifted in one direction by operation on one of said portions to seat said conical valve portion on said valve seat, and in another direction by operation on the other of said portions to unseat said valve portion and simultaneously seat said conical portions on said conical sealing seat means to thereby seal said valve bore regardless of the position of said valve member.

7. A device of the character described, comprising: a valve body, having a fluid conduit extending therethrough, and having a valve bore intersecting said conduit and traversing said body; and a valve member, disposed within said bore, shiftable longitudinally of said bore to establish or interrupt communication through said conduit, and having operative portions extending outwardly from the ends of said bore, on opposite sides of said body, whereby said member may be shifted in one direction by operation on one of said portions and in the other direction by operation on the other of said portions, said valve member being of two-part construction, and said operative portions being insertable from opposite sides of said valve bore and telescopically engageable.

THOMAS W. MILLER.